United States Patent
Ahmed

(10) Patent No.: US 10,108,397 B2
(45) Date of Patent: Oct. 23, 2018

(54) FAST CLOSE PATH SOLUTION FOR A THREE-PATH FUSED MULTIPLY-ADD DESIGN

(71) Applicant: Samsung Electronics Co., Ltd., Suwon-si, Gyeonggi-do (KR)

(72) Inventor: Ashraf Ahmed, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 341 days.

(21) Appl. No.: 15/012,825

(22) Filed: Feb. 1, 2016

(65) Prior Publication Data

US 2017/0060532 A1 Mar. 2, 2017

Related U.S. Application Data

(60) Provisional application No. 62/209,871, filed on Aug. 25, 2015.

(51) Int. Cl.
*G06F 7/483* (2006.01)
*G06F 7/544* (2006.01)

(52) U.S. Cl.
CPC ............ *G06F 7/483* (2013.01); *G06F 7/5443* (2013.01)

(58) Field of Classification Search
CPC ................................ G06F 7/5443; G06F 7/57
USPC ........................................ 708/501, 523, 603
See application file for complete search history.

(56) References Cited

U.S. PATENT DOCUMENTS

| | | | |
|---|---|---|---|
| 6,904,446 B2 | 6/2005 | Dibrino | |
| 8,037,118 B2 | 10/2011 | Quinnell et al. | |
| 8,499,017 B2 | 7/2013 | Penton et al. | |
| 8,892,619 B2 | 11/2014 | Galal et al. | |
| 2008/0256150 A1* | 10/2008 | Quinnell | G06F 7/483 708/209 |
| 2014/0122555 A1 | 5/2014 | Hickmann et al. | |

OTHER PUBLICATIONS

Eric Charles Quinnell, "Floating-Point Fused Multiply-Add Architectures," PhD Dissertation at University of Texas at Austin, May 2007.*

(Continued)

*Primary Examiner* — Matthew Sandifer
(74) *Attorney, Agent, or Firm* — Renaissance IP Law Group LLP

(57) ABSTRACT

Embodiments of the inventive concept include a fast close path solution and circuit of a three path fused multiply-adder circuit. The fast close path circuit can include one or more compressors that can receive multiple operands and produce a result sum and a result carry. The close path circuit can include one or more leading zero anticipators (LZAs). The one or more LZAs can receive and process the result sum and the result carry. The close path circuit can include one or more adders. The one or more adders can receive and add the result sum and the result carry in parallel with the one or more LZAs processing the result sum and the result carry. Since the close path is the critical timing path, by performing the addition operations in parallel with the LZA and/or priority encode (PENC) operations, the logic depth and latency of the close path are reduced.

14 Claims, 4 Drawing Sheets

(56) References Cited

OTHER PUBLICATIONS

T. Lang and J. D. Bruguera, "Floating-Point Fused Multiply-Add with Reduced Latency," Proceedings of the 2002 IEEE International Conference on Computer Design: VLSI in Computers and Processors, pp. 145-150, 2002.*

J. D. Bruguera and T. Lang, "Floating-Point Fused Multiply-Add: Reduced Latency for Floating-Point Addition," Proceedings of the 17th IEEE Symposium on Computer Arithmetic. pp. 42-51, Jun. 2005.*

Z. Qi, Q. Guo, G. Zhang, X. Li, and W. Hu, "Design of Low-Cost High-Performance Fused Multiply-Add with Reduced Power", Proc. 23rd Int. Conf. VLSI Design, pp. 206-218, 2010.*

* cited by examiner

FAST CLOSE PATH SOLUTION FOR A THREE-PATH FUSED MULTIPLY-ADD DESIGN

RELATED APPLICATION DATA

This application claims the benefit of U.S. Patent Application Ser. No. 62/209,871, filed Aug. 25, 2015, which is hereby incorporated by reference.

BACKGROUND

The present inventive concepts relate to digital circuits, and more particularly, to a fast close path solution for a three-path fused multiply-adder circuit.

Floating-point circuits are designed to perform various mathematical operations on floating-point numbers. Specialized hardware can be used to enhance the speed of such circuits and for implementing certain floating-point functions. For example, a fused multiply-adder circuit can be implemented within a floating-point circuit to perform multiply-accumulate functions that are commonly used in digital signal processing operations.

At a high level, a fused multiply-adder circuit basically combines a multiplication operation with an add operation to perform a single instruction execution of the equation $(A \times B) + C$. Within a fused multiply-adder circuit, a multiplicand and a multiplier are initially multiplied via a partial product generation module. The partial products are then added by a partial product reduction module that reduces the partial products to a sum and a carry in their redundant form. The redundant sum and carry are further added to an addend via a carry-save adder to form a second redundant sum and a second redundant carry. The second redundant sum and the second redundant carry are subsequently added within a carry-propagate adder to yield a sum total.

Since the early 1990s, a plethora of algorithms that utilize the $(A \times B) + C$ single-instruction equation have been introduced for applications in digital signal processing and graphics processing. To complement the ever increasing usage of the fused multiply-add instruction, the floating-point adder (FPA) and floating-point multiplier (FPM) of some chips are entirely replaced with a fused multiply-adder by using constants, such as $(A \times B) + 0.0$ for single multiplies and $(A \times 1.0) + C$ for single adds. The combination of industrial implementation and increasing algorithmic activities has prompted the IEEE 754R committee to consider the inclusion of the fused multiply-add instruction into the IEEE standard for floating-point arithmetic.

However, conventional fused multiply-adder circuits include a critical close path having a serial event chain that flows from a leading zero anticipator (LZA) stage, to a priority encoder (PENC) stage, to a normalizing shift stage, and finally to a full add/round stage. Consequently, in conventional approaches, the close path has excessive logic depth and therefore high latency. Embodiments of the present inventive concept address these and other limitations in the prior art.

BRIEF SUMMARY

Embodiments of the inventive concept can include a fast close path circuit of a fused multiply-adder circuit. The fast close path circuit can include one or more compressors configured to receive an addend, a product carry, and a product sum, and to produce a result sum vector and a result carry vector. The fast close path circuit can include one or more leading zero anticipators coupled to the one or more compressors. The one or more leading zero anticipators can receive and process the result sum vector and the result carry vector. The fast close path circuit can include one or more adders coupled to the one or more compressors. The one or more adders can receive and add the result sum vector and the result carry vector in parallel with the one or more leading zero anticipators processing the result sum vector and the result carry vector.

In some embodiments, a method includes providing a fast close path in a fused multiply-add circuit. The method can include receiving, by one or more compressors, an addend significand, a product carry, and a product sum. The method can include producing, by the one or more compressors, a result sum vector and a result carry vector. The method can include receiving and processing, by one or more leading zero anticipators, the result sum vector and the result carry vector. The method can include receiving, by one or more priority encoders, an output of the one or more leading zero anticipators. The method can include determining, by the one or more priority encoders, a shift amount. The method can include receiving, by one or more adders, the result sum vector and the result carry vector. The method can include adding, by the one or more adders, the result sum vector and the result carry vector in parallel with the one or more leading zero anticipators processing the result sum vector and the result carry vector.

Some embodiments include a fused multiply-adder circuit. The fused multiply-adder circuit can include a multiply array configured to receive a first significand and a second significand. The multiply array can produce a product carry and a product sum. The fused multiply-adder circuit can include an adder anchor path configured to receive a third addend significand, the product carry, and the product sum. The fused multiply-adder circuit can include a product anchor path configured to receive the third addend significand, the product carry, and the product sum. The fused multiply-adder circuit can include a fast close path circuit configured to receive the third addend significand, the product carry, and the product sum. The fast close path circuit can include one or more compressors configured to receive an addend significand, a product carry, and a product sum, and to produce a result sum vector and a result carry vector. The fast close path circuit can include one or more leading zero anticipators coupled to the one or more compressors. The one or more leading zero anticipators can receive and process the result sum vector and the result carry vector. The fast close path circuit can include one or more adders coupled to the one or more compressors. The one or more adders can receive and add the result sum vector and the result carry vector in parallel with the one or more leading zero anticipators processing the result sum vector and the result carry vector.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic stage could be termed a second logic stage, and, similarly, a second logic stage could be termed a first logic stage, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a close path of a three-path fused multiply-adder circuit having reduced gate depth, and therefore, reduced latency. By reducing gate depth and latency of the critical close path, the fused multiply-adder circuit can operate at a higher frequency.

Figure 1:
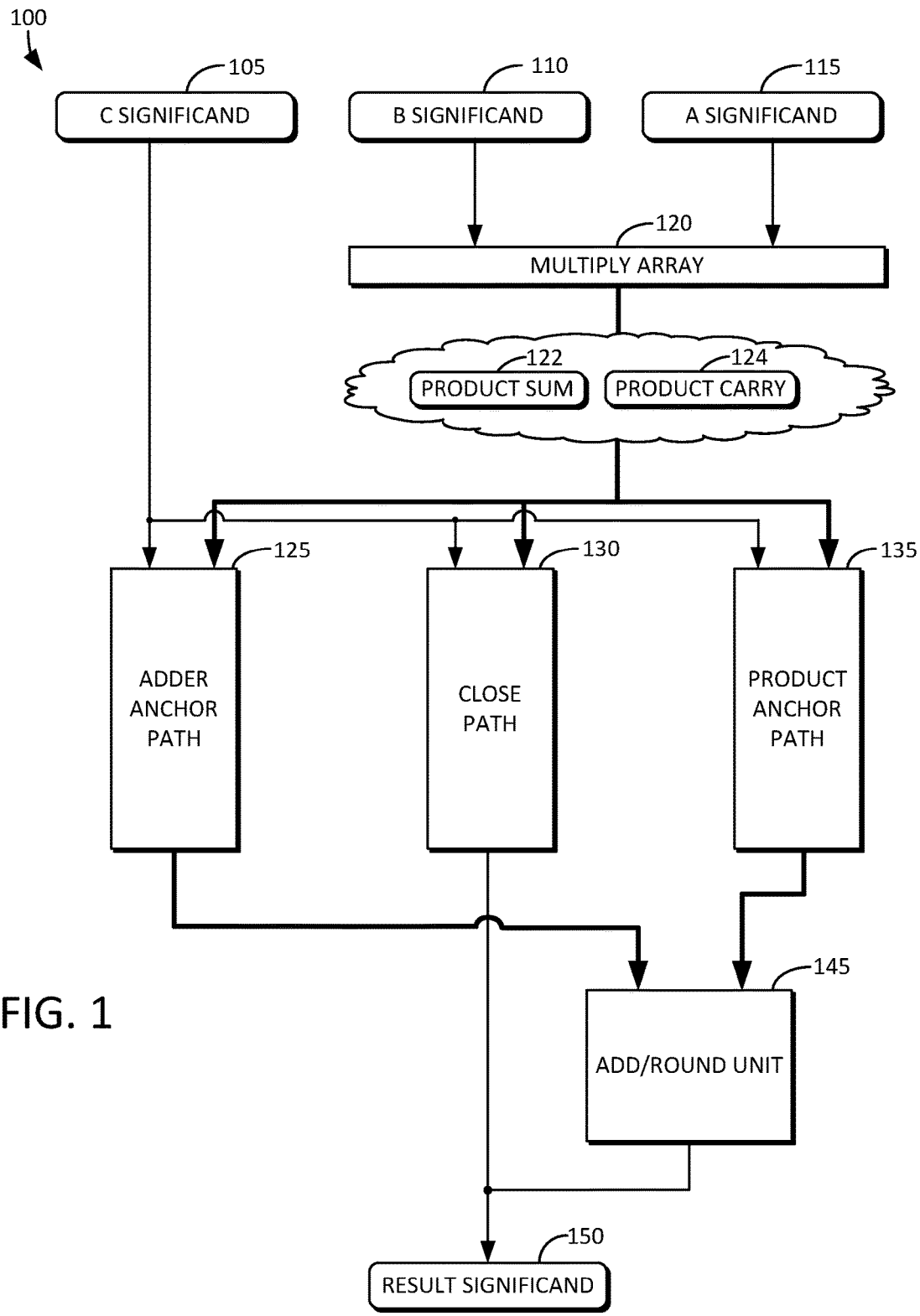
FIG. 1 is an example block diagram of a three-path fused multiply-adder in accordance with embodiments of the inventive concept.

FIG. 1 is an example block diagram of a three-path fused multiply-adder circuit 100 in accordance with embodiments of the inventive concept. The three-path fused multiply-adder circuit 100 can include a multiply array 120, an adder anchor path 125, a close path 130, a product anchor path 135, and an add/round unit 145. The add/round unit 145 need not be used in conjunction with the close path 130, as described in detail below. The multiply array 120 can receive an A significand 115 and a B significand 110. A C addend significand 105 can be provided directly to the adder anchor path 125. The three-path fused multiply-adder circuit 100 can split the data-path following a carry-save-adder (CSA) tree in a multiply array 120 into multiple paths, namely, the adder anchor path 125, the product anchor path 135, and the close path 130, with each path being designed with different data "anchors."

Such partitioning of anchor cases removes the need for a massive aligner component as well as a complementing stage. Instead, the three-path fused multiply-adder circuit 100 can partition point alignments and correct inversions at local levels. The thicker lines and arrows indicate a path having two operands (e.g., product sum 122 and product carry 124). The thinner lines and arrows indicate a path having one operand (e.g., C addend significand 105). The close path 130 can directly produce the result significand 150, as further described in detail below. Alternatively or in addition, the adder anchor path 125 and/or the product anchor path 135 can be routed via an add/round unit 145, which can output the result significand 150.

Figure 2:
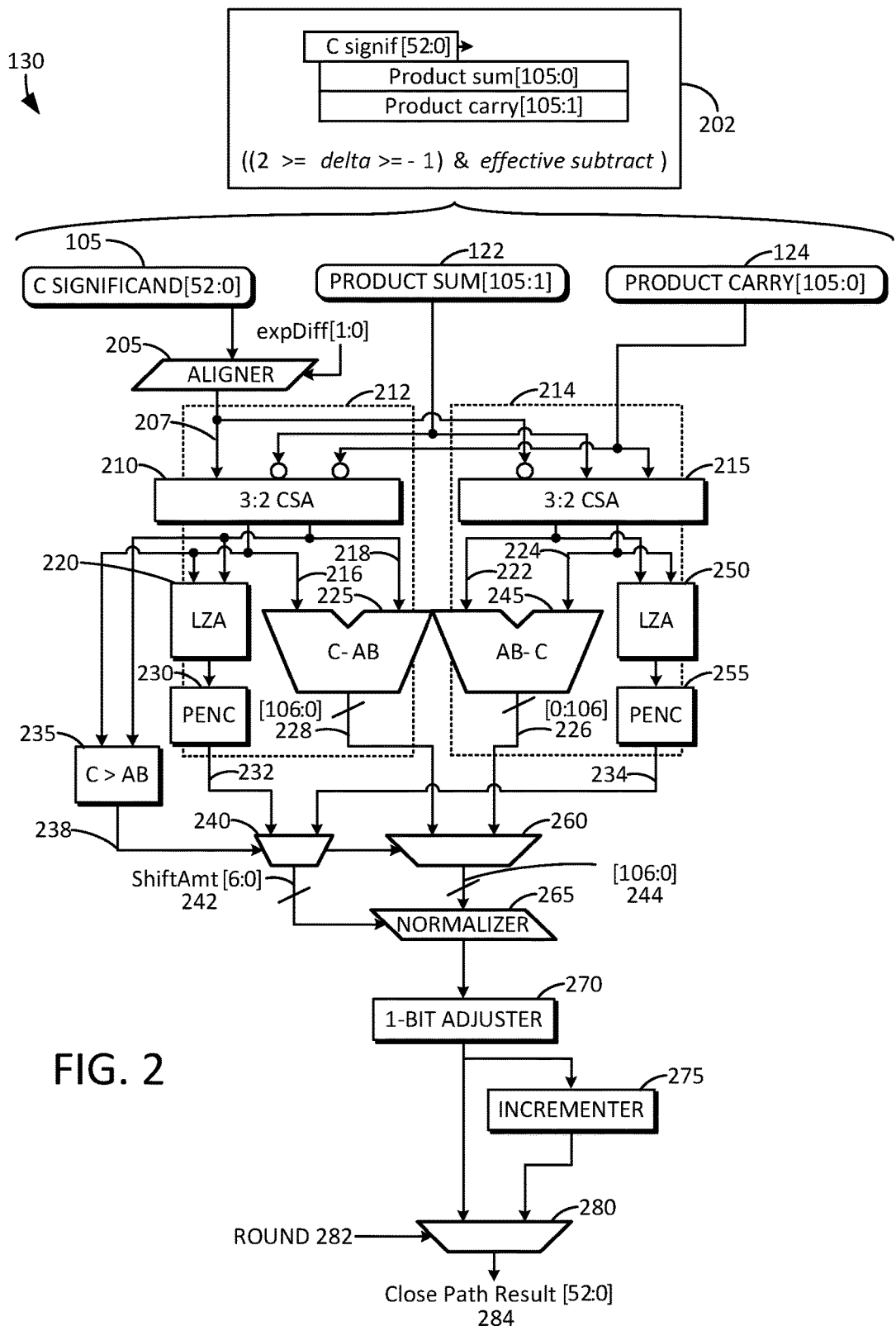
FIG. 2 is an example block diagram of a close path of the fused multiply-adder of FIG. 1.

FIG. 2 is an example block diagram of the close path circuit 130 of the three-path fused multiply-adder circuit 100 of FIG. 1. Given three floating-point operands (e.g., opA, opB, and opC), the three-path fused multiply-adder circuit 100 (of FIG. 1) can perform the function: result=opC+ (opA*opB). For example, where opA_Mant, opB_Mant, and opC_Mant are equal to mantissas of opA, opB, and opC, respectively; where opA_Exp, opB_Exp, and opC_Exp are equal to exponents of opA, opB, and opC, respectively; and where opA_Val, opB_Val, and opC_Val are equal to numeric values of opA, opB, and opC, respectively, then in the three-path solution to the fused multiply-add (FMA), the close path circuit 130 can cover the following set of cases. If delta is equal to (opC_Exp minus (opA_Exp plus opB_Exp)), then the close path circuit 130 covers all cases that satisfy ((2 greater than or equal to delta greater to or equal to −1) and (operation is an effective subtract)). In formulaic form: ((2>=delta>=−1) & (operation is an effective subtract)), as shown at 202.

Three operands can be presented to the close path circuit 130: opC_Mant (i.e., the addend significand), pS (i.e., the product sum), and pC (i.e., the product carry). More specifically, the close path circuit 130 can include and/or receive a C addend significand[52:0] (e.g., 105 of FIG. 1), a product sum[105:1] (e.g., 122 of FIG. 1), and a product carry[105:0] (e.g., 124 of FIG. 1). Pertaining to notation practices used herein, the [52:0] notation, for example, means a value having 53 bits with the most significant bit being 52 and the least significant bit being 0. By way of another example, the [105:1] notation means a value having 105 bits with the most significant bit being 105 and the least significant bit being 1. It will be understood that while some example bit notations are illustrated, other suitable bit notations, bit widths, and/or alternate configurations can be used without departing from the inventive concept described herein.

The close path circuit 130 can include a 3:2 CSA 210 and a 3:2 CSA 215 to combine an inverted aligned adder operand with the product terms, or an aligned adder operand with inverted product terms. The 3:2 notation in this context means that three (3) inputs are received by the logic block, and two (2) outputs are provided. In some embodiments, a logically opposite term can also be generated with inverted product operands and an un-complemented adder term. The 3:2 CSA 210 can receive as an input value an output value from an aligner 205. The aligner 205 can perform a small alignment of the C addend significand[52:0] 105 to produce an opCAlign value 207, which can align with the pS value 122 and the pC value 124. The aligner 205 can also receive signal expDiff[1:0] and perform the alignment based at least on the signal expDiff [1:0].

The flow of computation can be split into two sub-paths 212 and 214. In the first sub-path 212, the three operands are sent to the 3:2 CSA 210. More specifically, the opCAlign value 207, a negated pC value 124, and a negated pS value 122 can be sent to and received by the 3:2 CSA 210. The 3:2 CSA 210 can produce a result sum rS_CgeAB 216 vector and a result carry rC_CgeAB 218 vector. The rS_CgeAB 216 vector and the rC_CgeAB 218 vector are sent through a leading zero anticipator (LZA) 220 and a priority encoder (PENC) 230. The LZA 220 can determine a number of leading zeros. The PENC 230 can determine the shift amount ShftAmt_CgeAB 232 to normalize by. Pertaining to sub-path 212, it is assumed that C is greater to or equal to AB (i.e., CgeAB). In formulaic form, the meaning of CgeAB is as follows: CgeAB=(|opC_Val|>=|(opA_Val*opB_Val)|).

The first 3:2 combination output by the 3:2 CSA 210 can be passed to a comparator 235 to determine which operands are truly larger, i.e., whether C>AB. The comparator result can signal one or more selectors (e.g., multiplexors 240 and/or 260) to choose the correct inversion combination and the results can be normalized in preparation for incrementing and fast-rounding. In some embodiments, the multiplexors 240 and 260 can be a single multiplexor, which can select the correct inversion combination. More specifically, the comparator 235 can produce a selection signal 238, which can indicate whether C is greater than or equal to AB (i.e., C>=AB) or whether C is less than AB (i.e., C<AB). The selection signal 238 can function, at least in part, as a shift amount selection signal. Each of the multiplexors 240 and 260 can be controlled by the selection signal 238. In other words, the same selection signal 238 can be used for both of the multiplexors 240 and 260. As mentioned above, the LZA 220 can be passed a combination of inputs received from the 3:2 CSA 210, as its functionality is not affected by which operand is larger. In some embodiments, the LZA 220 can receive the output values from the 3:2 CSA 210 as input values. An output value of the LZA 220 can be passed to the PENC 230. The PENC 230 can encode the output value of the LZA 220. The selector or multiplexor 240 can receive as one input value the output value from the PENC 230. The multiplexor 240 can be controlled by the selection signal 238 produced by the comparator 235.

In the second sub-path 214, the three operands are sent to the 3:2 CSA 215. More specifically, a negated opCAlign value 207, the pC value 124, and the pS value 122 can be sent to and received by the 3:2 CSA 215. The 3:2 CSA 215 can produce a result sum rS_CltAB 222 vector and a result carry rC_CltAB 224 vector. The rS_CltAB 222 vector and the rC_CltAB 224 vector are sent through an LZA 250 and a PENC 255. The LZA 250 can determine a number of leading zeros. The PENC 255 can determine the shift amount ShftAmt_CltAB 234 to normalize by. Pertaining to sub-path 214, it is assumed that C is less than AB (i.e., CltAB). In formulaic form, the meaning of CltAB is as follows: CltAB=(|opC_Val|<|(opA_Val*opB_Val)|).

The LZA 250 can be passed a combination of inputs received from the 3:2 CSA 215, as its functionality is also not affected by which operand is larger. In some embodiments, the LZA 250 can receive the output values of the 3:2 CSA 215 as input values. An output value of the LZA 250 can be passed to a PENC 255. The PENC 255 can encode the output value of the LZA 250. The multiplexor 240 can receive as another input value the output value (e.g., 234) from the PENC 255. In parallel to sub-paths 212 and 214, the comparator 235 can determine whether C is greater than or equal to AB (i.e., CgeAB), or whether C is less than AB (i.e., CltAB). The term "in parallel to" or "in parallel with" as used herein means substantially simultaneously to or substantially simultaneously with.

The multiplexor 240 can be controlled by the output (e.g., 238) of the comparator 235. The multiplexor 240 can select the shift amount shftAmt[6:0] 242 from among the ShftAmt_CgeAB 232 and the ShftAmt_CltAB 234. For example, when CgeAB, then the multiplexor 240 can select the ShftAmt_CgeAB 232. Conversely, when CltAB, then the multiplexor 240 can select the ShftAmt_CltAB 234.

In accordance with embodiments of the inventive concept, an adder 225 and an adder 245 can be disposed in parallel with the LZAs (e.g., 220 and/or 250) and/or the PENCs (e.g., 230 and/or 255). The adder 225 can receive the output values from the 3:2 CSA 210 as input values. The adder 245 can receive the output values of the 3:2 CSA 215 as input values. The adder 225 and the adder 245 can process, in parallel to the LZAs and/or the PENCs, the output values of the 3:2 CSA 210 and the 3:2 CSA 215, respectively. The adder 225 can add the output values of the 3:2 CSA 210. The adder 245 can add the output values of the 3:2 CSA 215. More specifically, a non-normalized sum sum_CgeAB 228, of rS_CgeAB 216 and rC_CgeAB 218 can be computed in parallel with the LZA and/or the PENC computations. In addition, a non-normalized sum sum_CltAB 226, of rS_CltAB 222 and rC_CltAB 224 can be computed in parallel with the LZA and/or the PENC computations.

In some embodiments, a selector or multiplexor 260 can receive as input values the output values 228 and 226 of the adder 225 and the adder 245, respectively. The multiplexor 260 can be controlled by the output value (e.g., 238) of the comparator 235. The addition operations performed by the adder 225 and the adder 245 can occur prior to normalization. In other words, the adder 225 and the adder 245 can each produce an unnormalized sum. The multiplexor 260 can select from among the unnormalized sums produced by the adder 225 and the adder 245. More specifically, the multiplexor 260 can select a sum 244 from among sum_CgeAB 228 and sum_CltAB 226. For example, when CgeAB, then the multiplexor 260 can select the sum_CgeAB 228. Conversely, when CltAB, then the multiplexor 260 can select the sum_CltAB 226.

Since the close path 130 is the critical timing arc, by performing the addition operations in parallel with the LZA and PENC operations, the logic depth and latency are reduced. A normalizer 265 can receive as input values the output value (e.g., 242) of the multiplexor 240 and the output value (e.g., 244) of the multiplexor 260. For example, the normalizer 265 can receive a ShiftAmt[6:0] 242 from the multiplexor 240 and the sum 244 from the multiplexor 260. The normalizer 265 can normalize the sum 244 using the ShiftAmt[6:0] 242.

In some embodiments, a 1-bit adjuster 270 can receive an output value of the normalizer 265. The 1-bit-adjuster 270 can adjust the data by one bit. An output value of the 1-bit adjuster 270 can be passed to an incrementer 275, which can increment the value received from the 1-bit adjuster 270. The output value of the 1-bit-adjuster 270 can also be passed to a selector or multiplexor 280. The multiplexor 280 can receive output values from the 1-bit adjuster 270 and the incrementer 275. The multiplexor 280 can select from among such values. The multiplexor 280 can be controlled by a round signal 282. The multiplexor 280 can output a close path result[52:0] value 284. In accordance with embodiments of the inventive concept, the incrementer 275 can be used in place of a full adder, thereby increasing performance and decreasing latency. In addition, a single multiplexor 280 can be used for fast rounding, which is faster than a conventional full round step that uses multiple stages of muxing.

Figure 3:
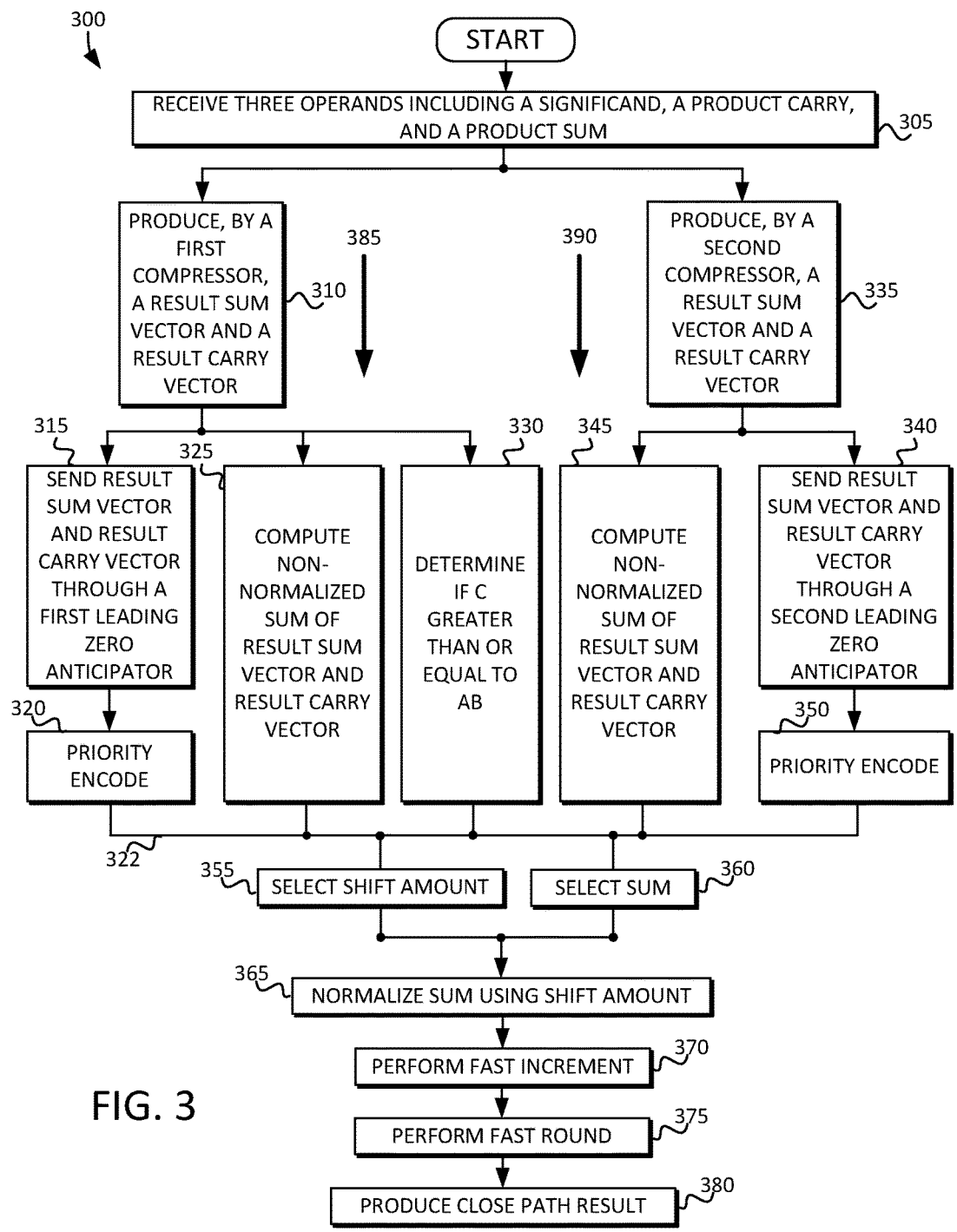
FIG. 3 shows a flow diagram illustrating a technique for providing a fast close path solution for a three-path fused multiply-add circuit in accordance with embodiments of the inventive concept.

FIG. 3 shows a flow diagram 300 illustrating a technique for providing a fast close path solution for a three-path fused multiply-add circuit in accordance with embodiments of the inventive concept. The technique can begin at 305, where a close path circuit (e.g., 130 of FIG. 1) can receive three operands including an addend significand (e.g., 105 of FIG. 1), a product carry (e.g., 124 of FIG. 1), and a product sum (e.g., 122 of FIG. 1). In some embodiments, the addend significand can be aligned (e.g., by aligner 205 of FIG. 2). The flow can proceed along two parallel paths 385 and 390. Steps in the path 385 can be performed in parallel with (i.e., substantially simultaneously with) steps in the path 390. The path 385 assumes CgeAB. The path 390 assumes CltAB.

In the path 385, a first compressor (e.g., 210 of FIG. 2) can produce a result sum vector (e.g., 216 of FIG. 2) and a result carry vector (e.g., 218 of FIG. 2) based at least on the addend significand, the product carry, and the product sum, as shown at 310. The path 385 can then split along three sub-paths 315, 325, and 330. At 315, the result sum vector (e.g., 216 of FIG. 2) and the result carry vector (e.g., 218 of FIG. 2) can be sent through a first LZA (e.g., 220 of FIG. 2). At 320, a first PENC (e.g., 230 of FIG. 2) can determine the shift amount (e.g., 232 of FIG. 2) to normalize by. Meanwhile, at 325, an adder (e.g., 225 of FIG. 2) can compute, in parallel, a non-normalized sum (e.g., 228 of FIG. 2) of the result sum vector (e.g., 216 of FIG. 2) and the result carry vector (e.g., 218 of FIG. 2). Moreover, a comparator (e.g., 235 of FIG. 2) can determine, in parallel, whether C is greater than or equal to AB, as shown at 330.

In the path 390, a second compressor (e.g., 215 of FIG. 2) can produce a result sum vector (e.g., 222 of FIG. 2) and a result carry vector (e.g., 224 of FIG. 2) based at least on the addend significand, the product carry, and the product sum, as shown at 335. The path 390 can then split along two sub-paths 340 and 345. At 340, the result sum vector (e.g., 222 of FIG. 2) and the result carry vector (e.g., 224 of FIG. 2) can be sent through a second LZA (e.g., 250 of FIG. 2). At 350, a second PENC (e.g., 255 of FIG. 2) can determine the shift amount (e.g., 234 of FIG. 2) to normalize by. Meanwhile, at 345, a second adder (e.g., 245 of FIG. 2) can compute, in parallel, a non-normalized sum (e.g., 226 of FIG. 2) of the result sum vector (e.g., 222 of FIG. 2) and the result carry vector (e.g., 224 of FIG. 2).

Figure 4:
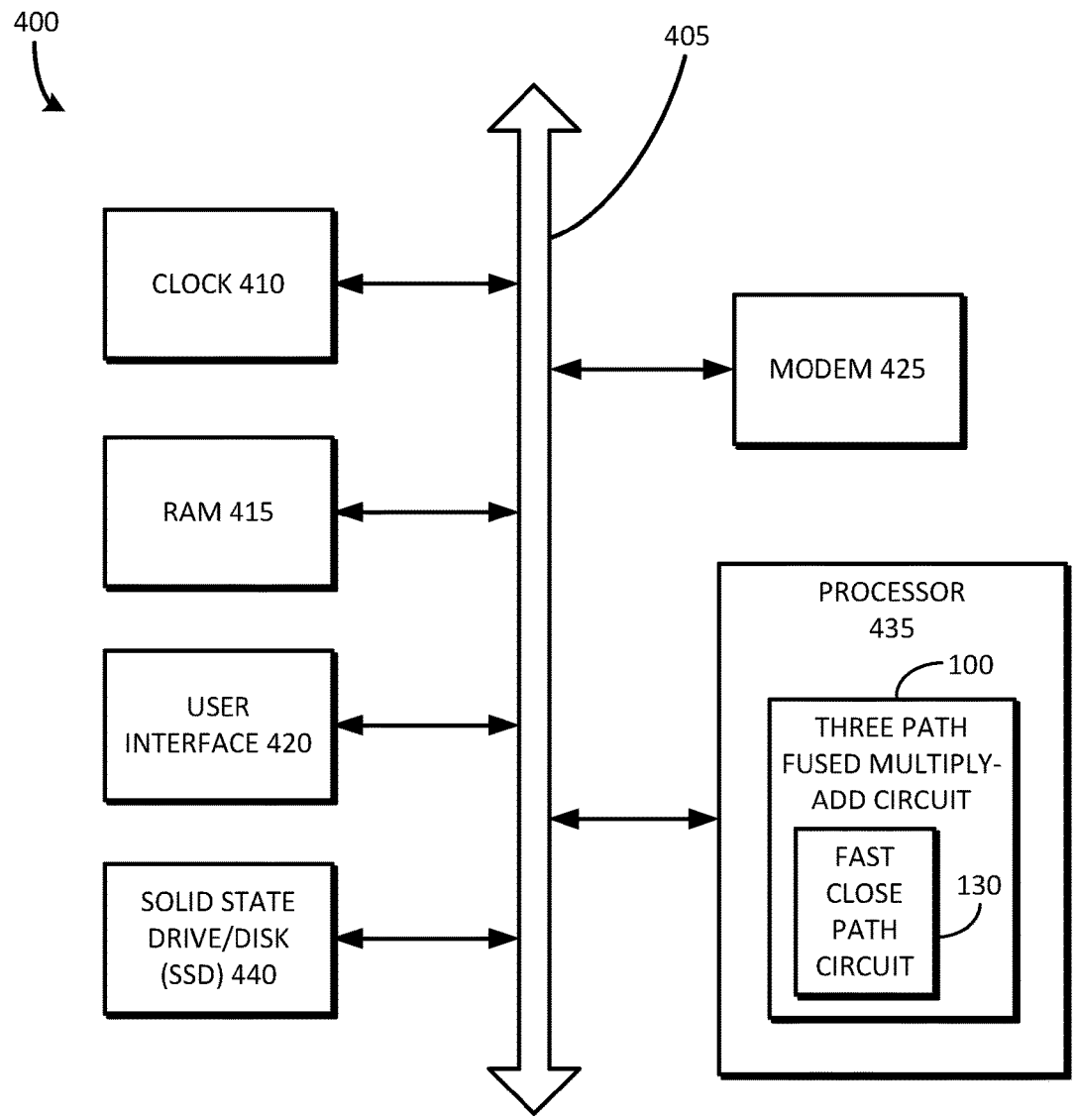
FIG. 4 is a block diagram of a computing system including the three-path fused multiply-add circuit of FIG. 1.

It will be understood that while the steps and elements of FIG. 4 are illustrated and described in a particular order, such steps and/or elements can be arranged in a different order, and may include intervening steps, without departing from embodiments of the inventive concept disclosed herein.

The two paths 385 and 390 can join at 322 where muxing stage can begin at 355 and 360. More specifically, at 355, a shift amount can be selected. For example, a multiplexor (e.g., 240 of FIG. 2) can select a shift amount (e.g., 242 of FIG. 2) from among a first shift amount (e.g., 232 of FIG. 2) and a second shift amount (e.g., 234 of FIG. 2). In other words, when CgeAB, then the multiplexor (e.g., 240 of FIG. 2) can select ShftAmt_CgeAB 232 (of FIG. 2). Conversely, when CltAB, then the multiplexor (e.g., 240 of FIG. 2) can select ShftAmt_CltAB (e.g., 234 of FIG. 2). At 360, a multiplexor (e.g., 260 of FIG. 2) can select a sum (e.g., 244 from FIG. 2) from among multiple sums (e.g., sum_CgeAB 228 and sum_CltAB 226 of FIG. 2). For example, when CgeAB, then the multiplexor (e.g., 260 of FIG. 2) can select the sum_CgeAB 228. Conversely, when CltAB, then the multiplexor (e.g., 260 of FIG. 2) can select the sum_CltAB 226.

At 365, a normalizer (e.g., 265 of FIG. 2) can normalize the selected sum (e.g., 244 of FIG. 2) using the shift amount determined at 355. At 370, an incrementer (e.g., 275 of FIG. 2) can increment the normalized sum. At 375, a fast round can be performed. For example, a multiplexer (e.g., 280 of FIG. 2) can be controlled by a round signal (e.g., 282 of FIG. 2), and can select from among the normalized sum and the incremented normalized sum. At 380, the close path circuit 130 can produce a close path result (e.g., 284 of FIG. 2).

FIG. 4 is a block diagram of a computing system 400 including the three-path fused multiply-add circuit 100 of FIG. 1. The computing system 400 can include a clock 410, a random access memory (RAM) 415, a user interface 420, a modem 425 such as a baseband chipset, a solid state drive/disk (SSD) 440, and/or a processor 435, any or all of which may be electrically coupled to a system bus 405. The processor 435 can include the three-path fused multiply-adder circuit 100 of FIG. 1, having the fast close path circuit 130. The three-path fused multiply-adder circuit 100 can include or otherwise interface with the clock 410, the random access memory (RAM) 415, the user interface 420, the modem 425, and/or the solid state drive/disk (SSD) 440.

In some embodiments, a fast close path circuit of a fused multiply-adder circuit can include one or more compressors configured to receive an addend significand, a product carry, and a product sum, and to produce a result sum vector and a result carry vector. The fast close path circuit can include one or more leading zero anticipators coupled to the one or more compressors. The one or more leading zero anticipators can receive and process the result sum vector and the result carry vector. The fast close path circuit can include one or more adders coupled to the one or more compressors. The one or more adders can receive and add the result sum vector and the result carry vector in parallel with the one or more leading zero anticipators processing the result sum vector and the result carry vector.

In some embodiments, the fast close path circuit can include one or more priority encoders coupled to the one or more leading zero anticipators. The one or more priority encoders can receive an output of the one or more leading zero anticipators, and to determine a shift amount. The one or more adders can receive and add the result sum vector and the result carry vector in parallel with the one or more priority encoders determining the shift amount.

The shift amount can be referred to as a first shift amount. The one or more priority encoders can include a first priority encoder configured to produce the first shift amount. The one or more priority encoders can include a second priority encoder configured to produce a second shift amount. The close path circuit can further include a comparator configured to produce a selection signal, and a selector configured to choose a selected shift amount from among the first shift amount and the second shift amount responsive to the selection signal.

The selector can be referred to as a first selector. The one or more adders can be configured to produce a first non-normalized sum and a second non-normalized sum. The fast close path circuit can further include a second selector configured to choose a selected sum from among the first non-normalized sum and the second non-normalized sum. The fast close path circuit can further include a normalizer configured to normalize the selected sum responsive to the selected shift amount.

The fast close path circuit can further include a 1-bit adjuster configured to adjust an output of the normalizer by one bit, an incrementer configured to increment an output of the 1-bit adjuster, and a third selector configured to choose from among the output of the 1-bit adjuster and an output of the incrementer responsive to a round signal, and to produce a close path result.

The one or more compressors can include a first compressor having a non-negated input configured to receive the addend significand, a first negated input configured to receive the product carry, and a second negated input configured to receive the product sum. The first compressor is configured to produce a first result sum vector and a first result carry vector. The one or more compressors can further include a second compressor having a negated input configured to receive the addend significand, a first non-negated input configured to receive the product carry, and a second non-negated input configured to receive the product sum. The second compressor can be configured to produce a second result sum vector and a second result carry vector.

The one or more adders can include a first adder configured to receive and add the first result sum vector and the first result carry vector. The one or more adders can further include a second adder configured to receive and add the second result sum vector and the second result carry vector. The one or more leading zero anticipators can include a first leading zero anticipator configured to receive and process the first result sum vector and the first result carry vector in parallel with the first adder adding the first result sum vector and the first result carry vector, and in parallel with the second adder adding the second result sum vector and the second result carry vector. The one or more leading zero anticipators further include a second leading zero anticipator configured to receive and process the second result sum vector and the second result carry vector in parallel with the first adder adding the first result sum vector and the first result carry vector, and in parallel with the second adder adding the second result sum vector and the second result carry vector.

The one or more priority encoders can include a first priority encoder configured to receive an output of the first leading zero anticipator, and to determine a first shift amount in parallel with the first adder adding the first result sum vector and the first result carry vector, and in parallel with the second adder adding the second result sum vector and the second result carry vector. The one or more priority encoders can further include a second priority encoder configured to receive an output of the second leading zero anticipator, and to determine a second shift amount in parallel with the first adder adding the first result sum vector and the first result carry vector, and in parallel with the second adder adding the second result sum vector and the second result carry vector.

The fast close path circuit can further include a comparator configured to produce a selection signal, and a first selector configured to choose a selected shift amount from among the first shift amount and the second shift amount responsive to the selection signal. The first adder can be configured to produce a first non-normalized sum. The second adder can be configured to produce a second non-normalized sum. The fast close path circuit can further include a second selector configured to choose a selected sum from among the first non-normalized sum and the second non-normalized sum. The fast close path circuit can further include a normalizer configured to normalize the selected sum responsive to the selected shift amount, a 1-bit adjuster configured to adjust an output of the normalizer by one bit, an incrementer configured to increment an output of the 1-bit adjuster, and a third selector configured to choose from among the output of the 1-bit adjuster and an output of the incrementer responsive to a round signal. The third selector can produce a close path result.

In some embodiments, a method includes providing a fast close path in a fused multiply-add circuit. The method can include receiving, by one or more compressors, an addend significand, a product carry, and a product sum. The method can include producing, by the one or more compressors, a result sum vector and a result carry vector. The method can include receiving and processing, by one or more leading zero anticipators, the result sum vector and the result carry vector. The method can include receiving, by one or more priority encoders, an output of the one or more leading zero anticipators. The method can include determining, by the one or more priority encoders, a shift amount. The method can include receiving, by one or more adders, the result sum vector and the result carry vector. The method can include adding, by the one or more adders, the result sum vector and the result carry vector in parallel with the one or more leading zero anticipators processing the result sum vector and the result carry vector.

The method can include adding, by the one or more adders, the result sum vector and the result carry vector in parallel with the one or more priority encoders determining the shift amount. The shift amount can be referred to as a first shift amount. The one or more priority encoders can include a first priority encoder and a second priority encoder. The method can include producing, by the first priority encoder, the first shift amount. The method can include producing, by the second priority encoder, a second shift amount. The method can include producing, by a comparator, a selection signal. The method can include choosing, by a selector, a selected shift amount from among the first shift amount and the second shift amount responsive to the selection signal.

The selector can be referred to as a first selector. The method can include producing, by the one or more adders, a first non-normalized sum and a second non-normalized sum. The method can include choosing, by a second selector, a selected sum from among the first non-normalized sum and the second non-normalized sum. The method can include normalizing, by a normalizer, the selected sum responsive to the selected shift amount. The method can include adjusting, by a 1-bit adjuster, an output of the normalizer by one bit. The method can include incrementing, by an incrementer, an output of the 1-bit adjuster. The method can include choosing, by a third selector, from among the output of the 1-bit adjuster and an output of the incrementer responsive to a round signal. The method can include producing, by the third selector, a close path result.

The one or more compressors can include a first compressor having a non-negated input, a first negated input, and a second negated input. The one or more compressors can further include a second compressor having a negated input, a first non-negated input, and a second non-negated input. The method can include receiving, by the non-negated input of the first compressor, the addend significand. The method can include receiving, by the first negated input of the first compressor, the product carry. The method can include receiving, by the second negated input of the first compressor, the product sum. The method can include receiving, by the negated input of the second compressor, the addend significand. The method can include receiving, by the first non-negated input of the second compressor, the product carry. The method can include receiving, by the second non-negated input of the second compressor, the product sum. The method can include producing, by the first compressor, a first result sum vector and a first result carry vector. The method can include producing, by the second compressor, a second result sum vector and a second result carry vector.

The one or more adders can include a first adder and a second adder. The one or more leading zero anticipators can include a first leading zero anticipator and a second leading zero anticipator. The one or more priority encoders can include a first priority encoder and a second priority encoder. The method can include receiving and adding, by the first adder, the first result sum vector and the first result carry vector. The method can include receiving and adding, by the second adder, the second result sum vector and the second result carry vector. The method can include receiving and processing, by the first leading zero anticipator, the first result sum vector and the first result carry vector in parallel with the first adder adding the first result sum vector and the first result carry vector, and in parallel with the second adder adding the second result sum vector and the second result carry vector. The method can include receiving and processing, by the second leading zero anticipator, the second result sum vector and the second result carry vector in parallel with the first adder adding the first result sum vector and the first result carry vector, and in parallel with the second adder adding the second result sum vector and the second result carry vector.

The method can include receiving, by the first priority encoder, an output of the first leading zero anticipator. The method can include determining, by the first priority encoder, a first shift amount in parallel with the first adder adding the first result sum vector and the first result carry vector, and in parallel with the second adder adding the second result sum vector and the second result carry vector. The method can include receiving, by the second priority encoder, an output of the second leading zero anticipator. The method can include determining, by the second priority encoder, a second shift amount in parallel with the first adder adding the first result sum vector and the first result carry vector, and in parallel with the second adder adding the second result sum vector and the second result carry vector.

Some embodiments include a fused multiply-adder circuit. The fused multiply-adder circuit can include a multiply array configured to receive a first significand and a second significand. The multiply array can produce a product carry and a product sum. The fused multiply-adder circuit can include an adder anchor path configured to receive a third addend significand, the product carry, and the product sum. The fused multiply-adder circuit can include a product anchor path configured to receive the third addend significand, the product carry, and the product sum. The fused multiply-adder circuit can include a fast close path circuit configured to receive the third addend significand, the product carry, and the product sum. The fast close path circuit can include one or more compressors configured to receive an addend significand, a product carry, and a product sum, and to produce a result sum vector and a result carry vector. The fast close path circuit can include one or more leading zero anticipators coupled to the one or more compressors. The one or more leading zero anticipators can receive and process the result sum vector and the result carry vector. The fast close path circuit can include one or more adders coupled to the one or more compressors. The one or more adders can receive and add the result sum vector and the result carry vector in parallel with the one or more leading zero anticipators processing the result sum vector and the result carry vector.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A fast close path circuit of a fused multiply-adder circuit, comprising:
   one or more compressors configured to receive an addend significand, a product carry, and a product sum, and to produce a result sum vector and a result carry vector;
   one or more leading zero anticipators coupled to the one or more compressors, the one or more leading zero anticipators being configured to receive and process the result sum vector and the result carry vector;
   one or more adders coupled to the one or more compressors, the one or more adders being configured to receive and add the result sum vector and the result carry vector in parallel with the one or more leading zero anticipators processing the result sum vector and the result carry vector;
   a first priority encoder coupled to the one or more leading zero anticipators, the first priority encoder being configured to receive an output of the one or more leading zero anticipators, and to produce a first shift amount;
   wherein the one or more adders are configured to receive and add the result sum vector and the result carry vector in parallel with the first priority encoder producing the first shift amount;
   a second priority encoder configured to produce a second shift amount;
   a comparator configured to produce a selection signal;
   a first selector configured to choose a selected shift amount from among the first shift amount and the second shift amount responsive to the selection signal;
   wherein the one or more adders are configured to produce a first non-normalized sum and a second non-normalized sum; and
   a second selector configured to choose a selected sum from among the first non-normalized sum and the second non-normalized sum responsive to the selection signal.

2. The fast close path circuit of a fused multiply-adder circuit of claim 1, further comprising:
   a normalizer configured to normalize the selected sum responsive to the selected shift amount.

3. The fast close path circuit of a fused multiply-adder circuit of claim 2, further comprising:
   a 1-bit adjuster configured to adjust an output of the normalizer by one bit.

4. The fast close path circuit of a fused multiply-adder circuit of claim 3, further comprising:
   an incrementer configured to increment an output of the 1-bit adjuster.

5. The fast close path circuit of a fused multiply-adder circuit of claim 4, further comprising:
   a third selector configured to choose from among the output of the 1-bit adjuster and an output of the incrementer responsive to a round signal, and to produce a close path result.

6. The fast close path circuit of a fused multiply-adder circuit of claim 1, wherein:
   the one or more compressors include a first compressor having a non-negated input configured to receive the addend significand, a first negated input configured to receive the product carry, and a second negated input configured to receive the product sum, wherein the first compressor is configured to produce a first result sum vector and a first result carry vector; and
   the one or more compressors further include a second compressor having a negated input configured to receive the addend significand, a first non-negated input configured to receive the product carry, and a second non-negated input configured to receive the product sum, wherein the second compressor is configured to produce a second result sum vector and a second result carry vector.

7. The fast close path circuit of a fused multiply-adder circuit of claim 6, wherein:
   the one or more adders include a first adder configured to receive and add the first result sum vector and the first result carry vector;
   the one or more adders further include a second adder configured to receive and add the second result sum vector and the second result carry vector;
   the one or more leading zero anticipators include a first leading zero anticipator configured to receive and process the first result sum vector and the first result carry vector in parallel with the first adder adding the first result sum vector and the first result carry vector, and in parallel with the second adder adding the second result sum vector and the second result carry vector;
   the one or more leading zero anticipators further include a second leading zero anticipator configured to receive and process the second result sum vector and the second result carry vector in parallel with the first adder adding the first result sum vector and the first result carry vector, and in parallel with the second adder adding the second result sum vector and the second result carry vector;
   the one or more priority encoders include a first priority encoder configured to receive an output of the first leading zero anticipator, and to determine a first shift amount in parallel with the first adder adding the first result sum vector and the first result carry vector, and in parallel with the second adder adding the second result sum vector and the second result carry vector; and
   the one or more priority encoders further include a second priority encoder configured to receive an output of the second leading zero anticipator, and to determine a second shift amount in parallel with the first adder adding the first result sum vector and the first result carry vector, and in parallel with the second adder adding the second result sum vector and the second result carry vector.

8. The fast close path circuit of a fused multiply-adder circuit of claim 7, further comprising:
a comparator configured to produce a selection signal;
a first selector configured to choose a selected shift amount from among the first shift amount and the second shift amount responsive to the selection signal;
wherein the first adder is configured to produce a first non-normalized sum;
wherein the second adder is configured to produce a second non-normalized sum;
a second selector configured to choose a selected sum from among the first non-normalized sum and the second non-normalized sum;
a normalizer configured to normalize the selected sum responsive to the selected shift amount;
a 1-bit adjuster configured to adjust an output of the normalizer by one bit;
an incrementer configured to increment an output of the 1-bit adjuster; and
a third selector configured to choose from among the output of the 1-bit adjuster and an output of the incrementer responsive to a round signal, and to produce a close path result.

9. A method for providing a fast close path in a fused multiply-add circuit, the method comprising:
receiving, by one or more compressors, an addend significand, a product carry, and a product sum;
producing, by the one or more compressors, a result sum vector and a result carry vector;
receiving and processing, by one or more leading zero anticipators, the result sum vector and the result carry vector;
receiving, by a first priority encoder, an output of the one or more leading zero anticipators;
determining, by the first priority encoder, a first shift amount;
receiving, by one or more adders, the result sum vector and the result carry vector;
adding, by the one or more adders, the result sum vector and the result carry vector in parallel with the one or more leading zero anticipators processing the result sum vector and the result carry vector;
adding, by the one or more adders, the result sum vector and the result carry vector in parallel with the first priority encoder determining the shift amount;
producing, by the first priority encoder, the first shift amount;
producing, by a second priority encoder, a second shift amount;
producing, by a comparator, a selection signal; and
choosing, by a first selector, a selected shift amount from among the first shift amount and the second shift amount responsive to the selection signal;
producing, by the one or more adders, a first non-normalized sum and a second non-normalized sum; and
choosing, by a second selector, a selected sum from among the first non-normalized sum and the second non-normalized sum.

10. The method of claim 9, further comprising:
normalizing, by a normalizer, the selected sum responsive to the selected shift amount;
adjusting, by a 1-bit adjuster, an output of the normalizer by one bit;
incrementing, by an incrementer, an output of the 1-bit adjuster;
choosing, by a third selector, from among the output of the 1-bit adjuster and an output of the incrementer responsive to a round signal; and
producing, by the third selector, a close path result.

11. The method of claim 9, wherein the one or more compressors include a first compressor having a non-negated input, a first negated input, and a second negated input, and the one or more compressors further include a second compressor having a negated input, a first non-negated input, and a second non-negated input, the method further comprising:
receiving, by the non-negated input of the first compressor, the addend significand;
receiving, by the first negated input of the first compressor, the product carry;
receiving, by the second negated input of the first compressor, the product sum;
receiving, by the negated input of the second compressor, the addend significand;
receiving, by the first non-negated input of the second compressor, the product carry;
receiving, by the second non-negated input of the second compressor, the product sum;
producing, by the first compressor, a first result sum vector and a first result carry vector; and
producing, by the second compressor, a second result sum vector and a second result carry vector.

12. The method of claim 11, wherein the one or more adders include a first adder and a second adder, the one or more leading zero anticipators include a first leading zero anticipator and a second leading zero anticipator, and the one or more priority encoders include a first priority encoder and a second priority encoder, the method further comprising:
receiving and adding, by the first adder, the first result sum vector and the first result carry vector;
receiving and adding, by the second adder, the second result sum vector and the second result carry vector;
receiving and processing, by the first leading zero anticipator, the first result sum vector and the first result carry vector in parallel with the first adder adding the first result sum vector and the first result carry vector, and in parallel with the second adder adding the second result sum vector and the second result carry vector;
receiving and processing, by the second leading zero anticipator, the second result sum vector and the second result carry vector in parallel with the first adder adding the first result sum vector and the first result carry vector, and in parallel with the second adder adding the second result sum vector and the second result carry vector;
receiving, by the first priority encoder, an output of the first leading zero anticipator;
determining, by the first priority encoder, a first shift amount in parallel with the first adder adding the first result sum vector and the first result carry vector, and in parallel with the second adder adding the second result sum vector and the second result carry vector;
receiving, by the second priority encoder, an output of the second leading zero anticipator; and
determining, by the second priority encoder, a second shift amount in parallel with the first adder adding the first result sum vector and the first result carry vector, and in parallel with the second adder adding the second result sum vector and the second result carry vector.

13. A fused multiply-adder circuit, comprising:
a multiply array configured to receive a first significand and a second significand, and to produce a product carry and a product sum;
an adder anchor path configured to receive a third addend significand, the product carry, and the product sum;
a product anchor path configured to receive the third addend significand, the product carry, and the product sum; and
a fast close path circuit configured to receive the third addend significand, the product carry, and the product sum, wherein the fast close path circuit includes:
one or more compressors configured to receive an addend significand, a product carry, and a product sum, and to produce a result sum vector and a result carry vector;
one or more leading zero anticipators coupled to the one or more compressors, the one or more leading zero anticipators being configured to receive and process the result sum vector and the result carry vector;
one or more adders coupled to the one or more compressors, the one or more adders being configured to receive and add the result sum vector and the result carry vector in parallel with the one or more leading zero anticipators processing the result sum vector and the result carry vector;
a first priority encoder configured to produce a first shift amount;
a second priority encoder configured to produce a second shift amount;
a comparator configured to produce a selection signal;
a first selector configured to choose a selected shift amount from among the first shift amount and the second shift amount responsive to the selection signal;
wherein the one or more adders are configured to produce a first non-normalized sum and a second non-normalized sum; and
a second selector configured to choose a selected sum from among the first non-normalized sum and the second non-normalized sum responsive to the selection signal.

14. The fused multiply-adder circuit of claim 13, wherein:
the one or more compressors include a first compressor having a non-negated input configured to receive the addend significand, a first negated input configured to receive the product carry, and a second negated input configured to receive the product sum, wherein the first compressor is configured to produce a first result sum vector and a first result carry vector; and
the one or more compressors further include a second compressor having a negated input configured to receive the addend significand, a first non-negated input configured to receive the product carry, and a second non-negated input configured to receive the product sum, wherein the second compressor is configured to produce a second result sum vector and a second result carry vector.

* * * * *